(12) United States Patent
Cho et al.

(10) Patent No.: US 8,936,849 B2
(45) Date of Patent: Jan. 20, 2015

(54) POLYAMIDE COMBINATION FILM PREPARED BY USING SAME, AND DISPLAY DEVICE INCLUDING THE FILM

(75) Inventors: Chung Kun Cho, Suwon-si (KR); Kalinina Fedosya, Suwon-si (KR); Kovalev Mikhail, Suwon-si (KR); Tai Gyoo Park, Hwaseong-si (KR); Young Suk Jung, Suwon-si (KR); Yoo Seong Yang, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 71 days.

(21) Appl. No.: 13/244,280

(22) Filed: Sep. 24, 2011

(65) Prior Publication Data

US 2012/0238698 A1    Sep. 20, 2012

(30) Foreign Application Priority Data

Mar. 16, 2011    (KR) ........................ 10-2011-0023333

(51) Int. Cl.
*B32B 27/34* (2006.01)
*C08L 77/00* (2006.01)
*C08L 77/06* (2006.01)
*C08L 77/10* (2006.01)

(52) U.S. Cl.
CPC ..................... *C08L 77/10* (2013.01)
USPC ........................... 428/220; 525/420; 525/432

(58) Field of Classification Search
CPC .......................................... C08G 69/00–69/42
USPC ................... 525/420, 432; 428/220
See application file for complete search history.

(56) References Cited

U.S. PATENT DOCUMENTS

| | | | |
|---|---|---|---|
| 5,637,653 A | 6/1997 | Preston et al. | |
| 2002/0142179 A1 | 10/2002 | Nanba et al. | |
| 2005/0288451 A1 | 12/2005 | Liedloff et al. | |
| 2006/0106193 A1 | 5/2006 | Moriyama et al. | |
| 2007/0160806 A1 | 7/2007 | Nakamura | |
| 2008/0124534 A1 | 5/2008 | Sakurai et al. | |
| 2008/0261010 A1 | 10/2008 | Wursche et al. | |
| 2009/0023002 A1 | 1/2009 | Nanba | |
| 2009/0163634 A1 | 6/2009 | Buhler et al. | |
| 2009/0286096 A1 | 11/2009 | Alting et al. | |
| 2009/0324884 A1 | 12/2009 | Nishi et al. | |

FOREIGN PATENT DOCUMENTS

| | | |
|---|---|---|
| JP | 2004-352833 A | 12/2004 |
| JP | 2005-022312 A | 1/2005 |
| JP | 2005-212389 A | 8/2005 |
| JP | 2008-208248 A | 9/2008 |
| JP | 2009-079210 A | 4/2009 |
| JP | 2009-149896 A | 7/2009 |
| KR | 1019950018293 A | 7/1995 |
| KR | 1020020064214 A | 8/2002 |
| KR | 1020060049211 A | 5/2006 |
| KR | 1020060078280 A | 7/2006 |
| KR | 1020070051276 A | 5/2007 |
| KR | 1020070058610 A | 6/2007 |
| KR | 1020070070321 A | 7/2007 |
| KR | 1020070104606 A | 10/2007 |
| KR | 1020080022113 A | 3/2008 |
| KR | 1020090125744 A | 12/2009 |

*Primary Examiner* — Ana Woodward
(74) *Attorney, Agent, or Firm* — Cantor Colburn LLP

(57) ABSTRACT

Provided are a polyamide combination that includes: a first polyamide including a repeating unit represented by Chemical Formula 1, a repeating unit represented by Chemical Formula 2, or a combination thereof; and a second polyamide including a repeating unit represented by Chemical Formula 3, and a film prepared using the polyamide combination.

Chemical Formula 1

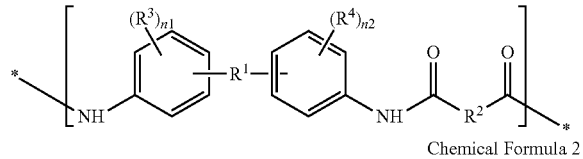

Chemical Formula 2

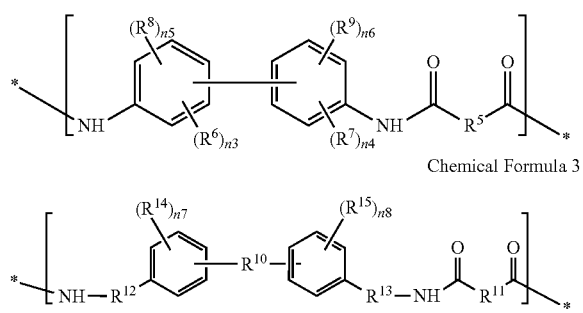

Chemical Formula 3

13 Claims, No Drawings

POLYAMIDE COMBINATION FILM PREPARED BY USING SAME, AND DISPLAY DEVICE INCLUDING THE FILM

CROSS-REFERENCE TO RELATED APPLICATION

This application claims priority to Korean Patent Application No. 10-2011-0023333, filed on Mar. 16, 2011, and all the benefits accruing therefrom under 35 U.S.C. §119, the content of which in its entirety is herein incorporated by reference.

BACKGROUND

1. Field

A polyamide combination, a film prepared by using the same, and a display device including the film are provided.

2. Description of the Related Art

A colorless and transparent material has been sought for various applications such as for an optical lens, a functional optical film, a storage disk substrate, and the like. While colorless and transparent materials are currently commercially available, the functionality and performance required for the materials are simultaneously precise and demanding, particularly when based on metrics required of rapid, small, light-weight, and highly miniaturized information devices. It is especially difficult to achieve colorlessness and transparency together with properties such as excellent heat resistance, mechanical strength, and flexibility, because variables that positively affect one of these properties can adversely affect another of these properties.

Accordingly, a colorless and transparent material having excellent transparency, heat resistance, mechanical strength, and flexibility has been actively researched yet still remains a continuing need in the art.

SUMMARY

An embodiment provides a polyamide combination having excellent transparency, heat resistance, mechanical strength, and flexibility.

Another embodiment provides a film prepared using the polyamide combination.

Yet another embodiment provides a display device including the film.

According to an embodiment, a polyamide combination is provided that includes a first polyamide including a repeating unit represented by the following Chemical Formula 1, a repeating unit represented by the following Chemical Formula 2, or a combination thereof, and a second polyamide including a repeating unit represented by the following Chemical Formula 3.

Chemical Formula 1

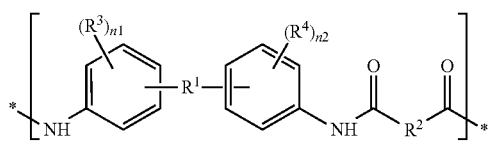

In Chemical Formula 1, $R^1$ is the same or different in each repeating unit, and each $R^1$ is independently a substituted or unsubstituted C3 to C30 alicyclic organic group, a substituted or unsubstituted C6 to C30 aromatic organic group, or a substituted or unsubstituted C2 to C30 heterocyclic group, $R^2$ is the same or different in each repeating unit, and each $R^2$ is independently a substituted or unsubstituted C6 to C30 aromatic organic group, $R^3$ and $R^4$ are the same or different and are each independently a halogen, a hydroxyl group, an ether group (—$OR^{200}$, wherein $R^{200}$ is a C1 to C10 aliphatic organic group), a silyl group (—$SiR^{201}R^{202}R^{203}$, wherein $R^{201}$, $R^{202}$, and $R^{203}$ are the same or different, and are each independently hydrogen or a C1 to C10 aliphatic organic group), a substituted or unsubstituted C1 to C10 aliphatic organic group, or a C6 to C20 aromatic organic group, and n1 and n2 are each independently integers ranging from 0 to 4.

Chemical Formula 2

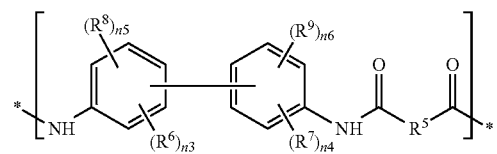

In Chemical Formula 2, $R^5$ is the same or different in each repeating unit, and each $R^5$ is independently a substituted or unsubstituted C6 to C30 aromatic organic group, $R^6$ and $R^7$ are the same or different and are each independently an electron withdrawing group, $R^8$ and $R^9$ are the same or different and are each independently a halogen, a hydroxyl group, an ether group (—$OR^{204}$, wherein $R^{204}$ is a C1 to C10 aliphatic organic group), a silyl group (—$SiR^{205}R^{206}R^{207}$, wherein $R^{205}$, $R^{206}$, and $R^{207}$ are the same or different, and are each independently hydrogen or a C1 to C10 aliphatic organic group), a substituted or unsubstituted C1 to C10 aliphatic organic group, or a C6 to C20 aromatic organic group, n3 is an integer ranging from 1 to 4, n5 is an integer ranging from 0 to 3, n3+n5 is an integer of 1 to 4, n4 is an integer ranging from 1 to 4, n6 is an integer ranging from 0 to 3, and n4+n6 is an integer of 1 to 4.

Chemical Formula 3

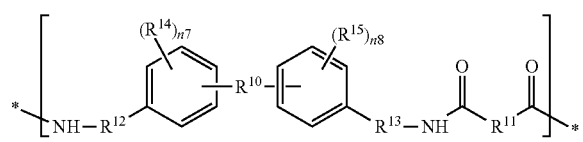

In Chemical Formula 3, $R^{10}$ is the same or different in each repeating unit, and each $R^{10}$ is independently a noncyclic Si-containing group, a noncyclic P-containing group, a noncyclic S-containing group, a halogen-substituted C1 to C10 aliphatic organic group, or a noncyclic ether bond (—O—)-containing group, $R^{11}$ is the same or different in each repeating unit, and each $R^{11}$ is independently a substituted or unsubstituted C6 to C30 aromatic organic group, $R^{12}$ and $R^{13}$ are the same or different in each repeating unit and are each independently a single bond or a substituted or unsubstituted C6 to C20 aromatic organic group, $R^{14}$ and $R^{15}$ are the same or different and are each independently a halogen, a hydroxyl group, an ether group (—$OR^{200}$, wherein $R^{200}$ is a C1 to C10 aliphatic organic group), a silyl group (—$SiR^{201}R^{202}R^{203}$ wherein $R^{201}$, $R^{202}$, and $R^{203}$ are the same or different, and are each independently hydrogen or a C1 to C10 aliphatic organic group), a substituted or unsubstituted C1 to C10 aliphatic organic group, or a C6 to C20 aromatic organic group, and n7 and n8 are each independently integers ranging from 0 to 4.

In Chemical Formula 1, $R^1$ may be selected from the following chemical formulae.

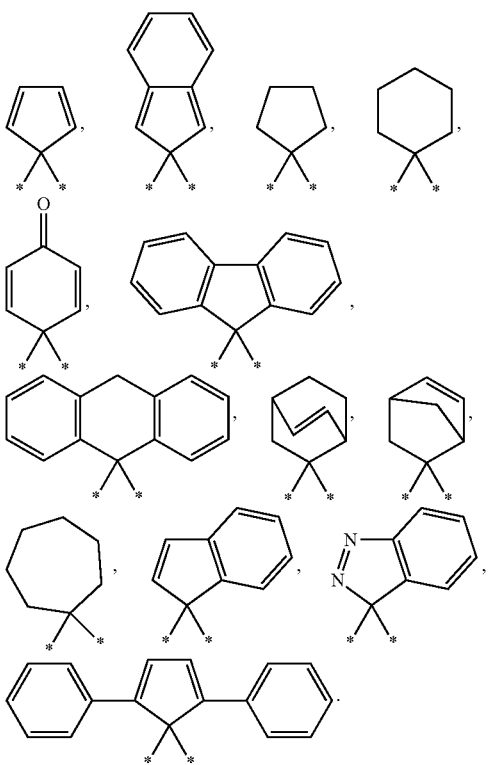

In Chemical Formula 2, $R^6$ and $R^7$ may be the same or different and are each independently —$CF_3$, —$CCl_3$, —$CBr_3$, —$I_3$, —F, —Cl, —Br, —I, —$NO_2$, —CN, —$COCH_3$, or —$CO_2C_2H_5$.

In Chemical Formula 3, $R^{10}$ may be —$SO_2$—, —O—, —$C(CF_3)_2$—, —$C(CCl_3)_2$—, —$C(CBr_3)_2$—, —$CF_2$—, $CCl_2$—, or —$CBr_2$—.

In Chemical Formula 3, $R^{12}$ and $R^{13}$ may be the same or different and are each independently a single bond, -Ph-, —O-Ph-, or —$C(CF_3)_2$-Ph-, where Ph is a phenylene group.

In Chemical Formulae 1 to 3, $R^2$, $R^5$ and $R^{11}$ are the same or different and are each independently selected from the following chemical formulae.

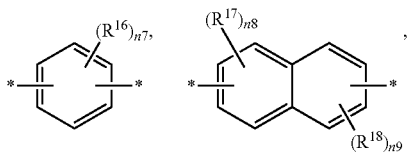

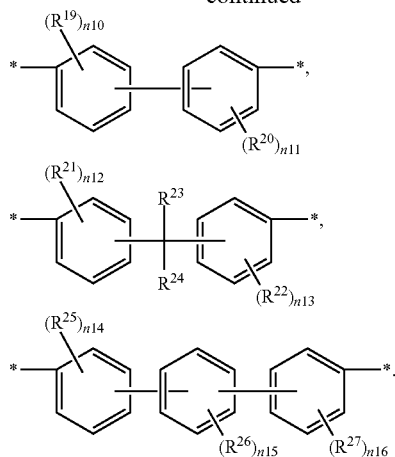

In the chemical formulae, $R^{16}$ to $R^{27}$ are the same or different and are each independently a halogen, a substituted or unsubstituted C1 to C10 aliphatic organic group, or a substituted or unsubstituted C6 to C20 aromatic organic group, n7 and n10 to n16 are each independently integers ranging from 0 to 4, and n8 and n9 are each independently integers ranging from 0 to 3.

Particularly, $R^2$, $R^5$, and $R^{11}$ are the same or different and are each independently selected from the following chemical formulae.

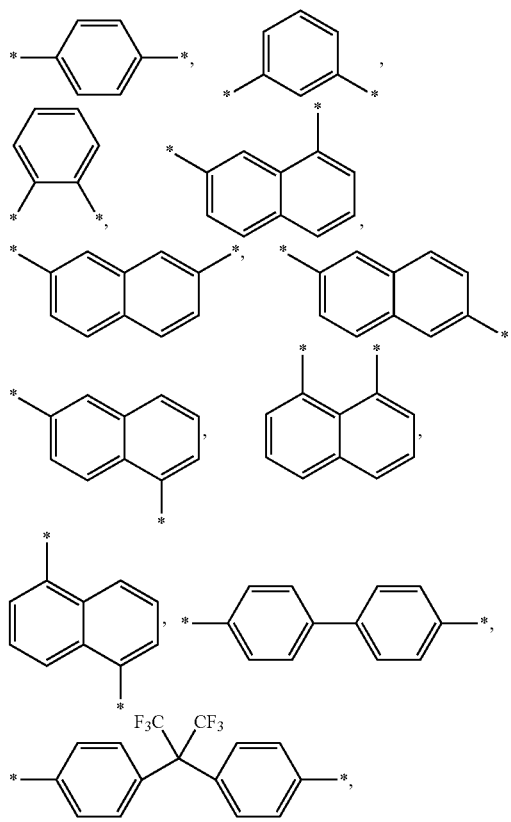

-continued

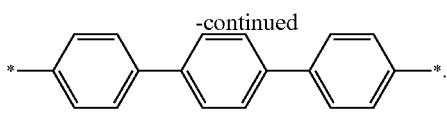

The first polyamide may further include a repeating unit represented by Chemical Formula 3. The second polyamide may further include the repeating unit represented by Chemical Formula 1, the repeating unit represented by Chemical Formula 2, or a combination thereof, provided that the first polyamide and the second polyamide do not have the same composition. In particular, when the second polyamide contains the repeating unit represented by Chemical Formula 1, the repeating unit represented by Chemical Formula 2, or a combination thereof, a mole percent (mol %) of the repeating unit represented by Chemical Formula 1, the repeating unit represented by Chemical Formula 2, or a combination thereof based on the total moles of repeating units of the first polyamide may be larger than a mole percent of the repeating unit represented by Chemical Formula 1, the repeating unit represented by Chemical Formula 2, or a combination thereof based on the total moles of repeating units of the second polyamide.

Particularly in this embodiment, the first polyamide may include the repeating unit represented by Chemical Formula 1, the repeating unit represented by Chemical Formula 2, or a combination thereof, in an amount of about 10 mol % or more based on the total moles of repeating units of the first polyamide, with the remainder being the repeating unit represented by Chemical Formula 3. More particularly, the first polyamide may include the repeating unit represented by Chemical Formula 1, the repeating unit represented by Chemical Formula 2, or a combination thereof, in an amount of about 30 mol % or more based on the total moles of repeating units of the first polyamide, with the remainder being the repeating unit represented by Chemical Formula 3.

Further in this embodiment, the second polyamide may include the repeating unit represented by Chemical Formula 1, the repeating unit represented by Chemical Formula 2, or a combination thereof, in an amount of less than about 30 mol % based on the total moles of repeating units of the second polyamide, with the remainder being the repeating unit represented by Chemical Formula 3. More particularly, the second polyamide may include the repeating unit represented by Chemical Formula 1, the repeating unit represented by Chemical Formula 2, or a combination thereof, in an amount of less than about 10 mol % based on the total moles of repeating units of the second polyamide, with the remainder being the repeating unit represented by Chemical Formula 3.

When the first polyamide further includes the repeating unit represented by Chemical Formula 3, and the second polyamide further includes the repeating unit represented by Chemical Formula 1, the repeating unit represented by Chemical Formula 2, or a combination thereof, the first polyamide may include the repeating unit represented by Chemical Formula 1, the repeating unit represented by Chemical Formula 2, or a combination thereof, in an amount of about 20 mol % to about 40 mol % based on the total moles of repeating units of the first polyamide, and the second polyamide may include the repeating unit represented by Chemical Formula 1, the repeating unit represented by Chemical Formula 2, or a combination thereof, in an amount of about 20 mol % to about 40 mol % based on the total moles of repeating units of the second polyamide, provided that the amount of the repeating unit represented by Chemical Formula 1, the repeating unit represented by Chemical Formula 2, or a combination thereof is greater in the first polyamide than in the second polyamide.

The first polyamide may have an average molecular weight ("Mw") of about 20,000 grams/mole (g/mol) to about 400,000 g/mol.

The second polyamide may have an average molecular weight (Mw) of about 20,000 g/mol to about 400,000 g/mol.

The polyamide combination may include the first polyamide and the second polyamide at a weight ratio of the first polyamide to the second polyamide of about 1:99 to about 60:40, and particularly about 10:90 to about 40:60.

The polyamide combination may have a total light transmittance at a wavelength range of about 380 nm to about 700 nm of about 80% or more, and light transmittance at a wavelength of about 400 nm of about 60% or more.

According to another embodiment, a film prepared using the polyamide combination is provided.

The film may have a coefficient of thermal expansion of about 40 parts per million (ppm)/° C. or less.

According to yet another embodiment, a display device including the film is provided.

Hereinafter, further embodiments will be described in detail.

DETAILED DESCRIPTION

This disclosure will be described more fully hereinafter. The invention may, however, be embodied in many different forms and is not to be construed as limited to the exemplary embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, when a definition is not otherwise provided, the term "substituted" may refer to a compound or group substituted with a substituent selected from a halogen (F, Br, Cl, or I), a hydroxyl group, a nitro group, a cyano group, an amino group ($NH_2$, $NH(R^{100})$ or $N(R^{101})(R^{102})$, wherein $R^{100}$, $R^{101}$, and $R^{102}$ are the same or different, and are each independently a C1 to C10 alkyl group), an amidino group, a hydrazino group, a hydrazono group, a carboxyl group, a substituted or unsubstituted alkyl group, a substituted or unsubstituted alicyclic organic group, a substituted or unsubstituted aryl group, a substituted or unsubstituted alkenyl group, a substituted or unsubstituted alkynyl group, a substituted or unsubstituted heteroaryl group, and a substituted or unsubstituted heterocyclic group, in place of at least one hydrogen of a functional group, provided that the substituted atom's valence is not exceeded. Further, unless otherwise provided, the valence of any atom not specifically substituted is satisfied with hydrogen, for example a six-membered aryl ring having three named substituents further has three hydrogen atoms filling the remaining valences. Moreover, unless otherwise provided, "hydrogen" may refer to all isotopes of hydrogen, e.g., hydrogen, deuterium, and tritium, in either a natural abundance or an isotopically enriched amount.

As used herein, when a specific definition is not otherwise provided, the term "alkyl group" may refer to a straight or branched chain saturated hydrocarbon having the specified number of carbon atoms, particularly a C1 to C30 alkyl group, more particularly a C1 to C15 alkyl group; the term "cycloalkyl group" may refer to a monovalent group having one or more saturated rings in which all ring members are carbon, particularly a C3 to C30 cycloalkyl group, more particularly a C3 to C18 cycloalkyl group; the term "alkoxy group" may refer to an alkyl group that is linked via an oxygen (RO—) particularly a C1 to C30 alkoxy group, more particularly a C1 to C18 alkoxy group; the term "aryl group" may refer to a cyclic moiety in which all ring members are carbon and at least one ring is aromatic, the moiety having the specified number of carbon atoms, particularly a C6 to C30 aryl group, more particularly a C6 to C18 aryl group; the term "alkenyl group" may refer to a straight or branched chain, monovalent hydrocarbon group having at least one carbon-carbon double bond, particularly a C2 to C30 alkenyl group, more particularly a C2 to C18 alkenyl group; the term "alkylene group" may refer to a straight or branched chain, saturated, divalent aliphatic hydrocarbon group, particularly a C1 to C30 alkylene group, more particularly a C1 to C18 alkylene group; and the term "arylene group" may refer to a divalent group formed by the removal of two hydrogen atoms from one or more rings of an arene, wherein the hydrogen atoms may be removed from the same or different rings, particularly a C6 to C30 arylene group, more particularly a C6 to C16 arylene group.

As used herein, when a specific definition is not otherwise provided, the term "aliphatic organic group" may refer to a saturated or unsaturated, linear or branched hydrocarbon group, particularly a C1 to C30 alkyl group, a C2 to C30 alkenyl group, a C2 to C30 alkynyl group, a C1 to C30 alkylene group, a C2 to C30 alkenylene group, or a C2 to C30 alkynylene group, particularly a C1 to C15 alkyl group, a C2 to C15 alkenyl group, a C2 to C15 alkynyl group, a C1 to C15 alkylene group, a C2 to C15 alkenylene group, or C2 to C15 alkynylene group; the term "alicyclic organic group" may refer to an aliphatic cyclic, particularly a C3 to C30 cycloalkyl group, a C3 to C30 cycloalkenyl group, a C3 to C30 cycloalkynyl group, a C3 to C30 cycloalkylene group, a C3 to C30 cycloalkenylene group, or a C3 to C30 cycloalkynylene group, more particularly a C3 to C15 cycloalkyl group, a C3 to C15 cycloalkenyl group, a C3 to C15 cycloalkynyl group, a C3 to C15 cycloalkylene group, a C3 to C15 cycloalkenylene group, or a C3 to C15 cycloalkynylene group; the term "aromatic organic group" may refer to an aryl group or arylene group, particularly a C6 to C30 aryl group or a C6 to C30 arylene group, more particularly a C6 to C16 aryl group or a C6 to C16 arylene group; and the term "heterocyclic group" may refer to a group that comprises at least one ring member that is a heteroatom, particularly a C2 to C30 cycloalkyl group, a C2 to C30 cycloalkylene group, a C2 to C30 cycloalkenyl group, a C2 to C30 cycloalkenylene group, a C2 to C30 cycloalkynyl group, a C2 to C30 cycloalkynylene group, a C2 to C30 heteroaryl group, or a C2 to C30 heteroarylene group that includes 1 to 3 heteroatoms selected from O, S, N, P, and Si, and a combination thereof in one ring, more particularly a C2 to C15 cycloalkyl group, a C2 to C15 cycloalkylene group, a C2 to C15 cycloalkenyl group, a C2 to C15 cycloalkenylene group, a C2 to C15 cycloalkynyl group, a C2 to C15 cycloalkynylene group, a C2 to C15 heteroaryl group, or a C2 to C15 heteroarylene group that includes 1 to 3 heteroatoms selected from O, S, N, P, and Si, and a combination thereof in one ring.

As used herein, when a definition is not otherwise provided, "combination" refers to a blend, mixture, reaction product, alloy, solution, suspension, or copolymer. Herein, "copolymerization" refers to block copolymerization, graft copolymerization, or random copolymerization, and "copolymer" may refer to a block copolymer, graft copolymer, or a random copolymer.

In addition, in the specification, an asterisk, i.e., the mark "*," may refer to where something (e.g., an atom or group) is connected, i.e., a point of attachment, with the same or different atom or chemical formula.

According to an embodiment, a polyamide combination includes a first polyamide including a repeating unit represented by the following Chemical Formula 1, a repeating unit represented by the following Chemical Formula 2, or a combination thereof, and a second polyamide including a repeating unit represented by the following Chemical Formula 3.

Chemical Formula 1

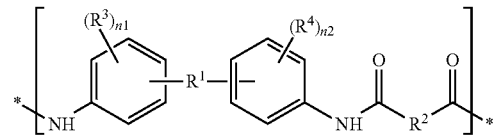

In Chemical Formula 1, $R^1$ is the same or different in each repeating unit, and each $R^1$ independently includes a substituted or unsubstituted C3 to C30 alicyclic organic group, a substituted or unsubstituted C6 to C30 aromatic organic group, or a substituted or unsubstituted C2 to C30 heterocyclic group, particularly a substituted or unsubstituted C3 to C20 alicyclic organic group, a substituted or unsubstituted C6 to C20 aromatic organic group, or a substituted or unsubstituted C2 to C20 heterocyclic group.

$R^2$ is the same or different in each repeating unit, and each $R^2$ is independently a substituted or unsubstituted C6 to C30 aromatic organic group, and particularly a substituted or unsubstituted C6 to C20 aromatic organic group.

$R^3$ and $R^4$ are the same or different and are each independently a halogen, a hydroxyl group, an ether group (—$OR^{200}$, wherein $R^{200}$ is a C1 to C10 aliphatic organic group, particularly a C1 to C6 aliphatic group), a silyl group (—$SiR^{201}R^{202}R^{203}$ wherein $R^{201}$, $R^{202}$, and $R^{203}$ are the same or different, and are each independently hydrogen or a C1 to C10 aliphatic organic group, particularly a C1 to C6 aliphatic organic group), a substituted or unsubstituted C1 to C10 aliphatic organic group and particularly a C1 to C6 aliphatic organic group, or a C6 to C20 aromatic organic group and particularly a C6 to C12 aromatic organic group.

Also, n1 and n2 are each independently an integer ranging from 0 to 4.

Without being bound by theory, since the repeating unit represented by Chemical Formula 1 may have a rigid structure due to the presence of the cyclic group $R^1$, it may improve the heat resistance and mechanical strength of the polyamide combination including the same.

In an embodiment, the polyamide may have a color determined by an intramolecular and/or intermolecular charge-transfer complex. Without being bound by theory, in a polyamide containing a repeating unit represented by Chemical Formula 1, since $R^1$ has a cyclic structure, the electron cloud of $R^1$ may interrupt the electron cloud of the polymer's molecular chain to prevent the formation of the intramolecular charge transfer complex. In addition, the relatively large-volume $R^1$ may prevent the formation of an intermolecular charge-transfer complex. Thereby, the polyamide combination including a repeating unit represented by Chemical Formula 1 may be colorless and/or transparent.

In addition without being bound by theory, since $R^1$ has a stable cyclic structure, it may improve the heat resistance and mechanical strength of a polyamide combination including the repeating unit represented by Chemical Formula 1.

In Chemical Formula 1, $R^1$ may be selected from the following chemical formulae, but is not limited thereto.

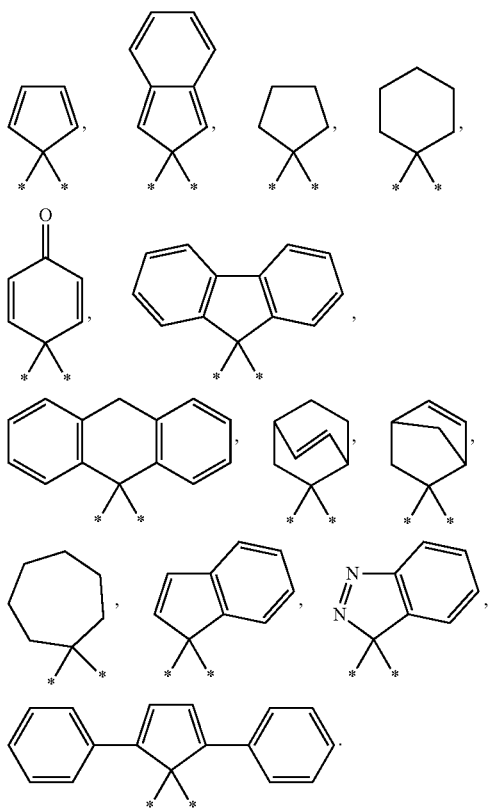

In Chemical Formula 1, since $R^2$ also has a stable cyclic structure (an aromatic organic group), it may improve the heat resistance and the mechanical strength of a polyamide combination including the repeating unit represented by Chemical Formula 1.

In an embodiment, $R^2$ may be selected from the following chemical formulae, but is not limited thereto.

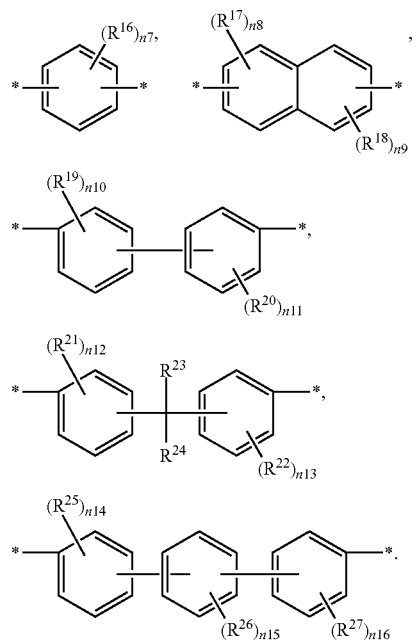

In the chemical formulae, $R^{16}$ to $R^{27}$ are the same or different and are each independently a halogen, a substituted or unsubstituted C1 to C10 aliphatic organic group and particularly a C1 to C6 aliphatic organic group, or a substituted or unsubstituted C6 to C20 aromatic organic group and particularly a C6 to C12 aromatic organic group, n7 and n10 to n16 are each independently integers ranging from 0 to 4, and n8 and n9 are each independently integers ranging from 0 to 3.

More particularly, $R^2$ may be selected from the following chemical formulae, but is not limited thereto.

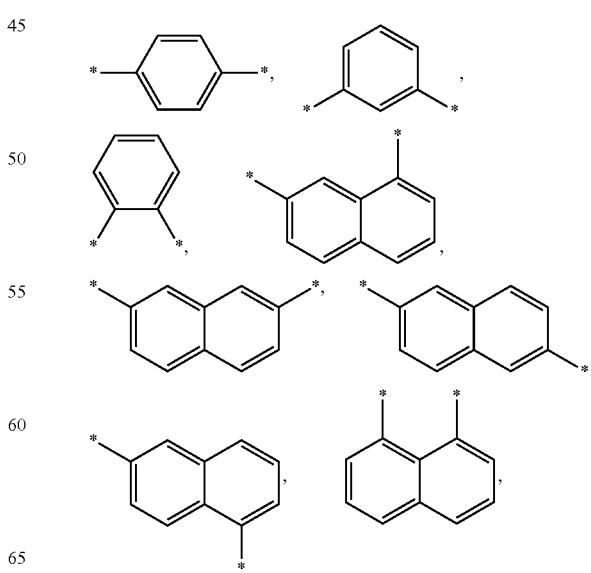

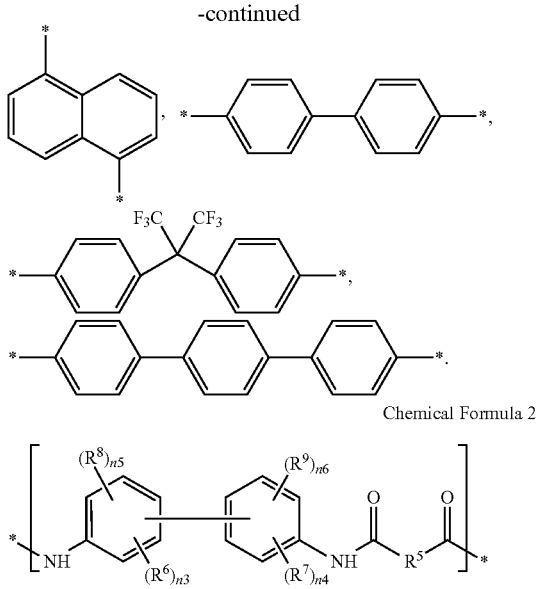

Chemical Formula 2

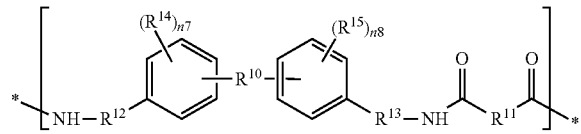

Chemical Formula 3

In Chemical Formula 2, $R^5$ is the same or different in each repeating unit, and each $R^5$ is independently a substituted or unsubstituted C6 to C30 aromatic organic group, and particularly a substituted or unsubstituted C6 to C20 aromatic organic group.

$R^6$ and $R^7$ are the same or different and are each independently an electron withdrawing group.

$R^8$ and $R^9$ are the same or different and are each independently a halogen, a hydroxyl group, an ether group (—$OR^{204}$, wherein $R^{204}$ is a C1 to C10 aliphatic organic group and particularly a C1 to C5 aliphatic organic group), a silyl group (—$SiR^{205}R^{206}R^{207}$, wherein $R^{205}$, $R^{206}$, and $R^{207}$ are the same or different, and are each independently hydrogen or a C1 to C10 aliphatic organic group and particularly a C1 to C5 aliphatic organic group), a substituted or unsubstituted C1 to C10 aliphatic organic group and particularly a substituted or unsubstituted C1 to C5 aliphatic organic group, or a C6 to C20 aromatic organic group and particularly a C6 to C12 aromatic organic group.

Also, n3 is an integer ranging from 1 to 4, specifically 1 to 2, n5 is an integer ranging from 0 to 3, n3+n5 is an integer of 1 to 4, specifically 1 to 2, n4 is an integer ranging from 1 to 4, n6 is an integer ranging from 0 to 3, and n4+n6 is an integer of 1 to 4. The integers (n3+n5) and (n4+n6) have a lower bound of 1 since n3 and n4 have a lower bound of 1.

Without being bound by theory, since the repeating unit represented by Chemical Formula 2 may have a rigid structure, it may improve heat resistance and mechanical strength of a polyamide combination including the same.

In Chemical Formula 2, since $R^5$ has a stable cyclic structure (an aromatic organic group), it may improve the heat resistance and the mechanical strength of a polyamide combination including the repeating unit represented by Chemical Formula 2.

The specific examples of $R^5$ are the same as the specific examples of the formulae above described for $R^2$.

In addition, since the repeating unit represented by Chemical Formula 2 includes electron withdrawing groups of $R^6$ and $R^7$, which, without being bound by theory may interfere with the formation of the intramolecular and intermolecular electron-transfer complexes, Chemical Formula 2 may improve the colorlessness and/or transparency of a polyamide combination including a repeating unit represented by Chemical Formula 2.

Particularly in an embodiment, $R^6$ and $R^7$ are groups showing positive values in Hammett's substituent constant, and, for example, are independently —$CF_3$, —$CCl_3$, —$CBr_3$, —$Cl_3$, —F, —Cl, —Br, —I, —$NO_2$, —CN, —$COCH_3$, or —$CO_2C_2H_5$, and more particularly, —$CF_3$, —$CCl_3$, —$NO_2$, or —CN.

In Chemical Formula 3, $R^{10}$ is the same or different in each repeating unit, and each $R^{10}$ is independently a noncyclic silicon (Si)-containing group, a noncyclic phosphorous (P)-containing group, a noncyclic sulfur (S)-containing group, a halogen-substituted C1 to C10 aliphatic organic group, in particular a C1 to C5 aliphatic organic group, or a noncyclic ether bond (—O—)-containing group.

$R^{11}$ is the same or different in each repeating unit, and each $R^{11}$ is independently a substituted or unsubstituted C6 to C30 aromatic organic group, and particularly a substituted or unsubstituted C6 to C20 aromatic organic group.

$R^{12}$ and $R^{13}$ are the same or different in each repeating unit and are each independently a single bond or a substituted or unsubstituted C6 to C20 aromatic organic group, and particularly a substituted or unsubstituted C6 to C12 aromatic organic group.

$R^{14}$ and $R^{15}$ are the same or different and are each independently a halogen, a hydroxyl group, an ether group (—$OR^{200}$, wherein $R^{200}$ is a C1 to C10 aliphatic organic group and particularly a C1 to C5 aliphatic organic group), a silyl group (—$SiR^{201}R^{202}R^{203}$, wherein $R^{201}$, $R^{202}$, and $R^{203}$ are the same or different, and are each independently hydrogen or a C1 to C10 aliphatic organic group and particularly a C1 to C5 aliphatic organic group), a substituted or unsubstituted C1 to C10 aliphatic organic group and particularly a substituted or unsubstituted C1 to C5 aliphatic organic group, or a C6 to C20 aromatic organic group and particularly a C6 to C12 aromatic organic group.

Also, n7 and n8 are each independently integers ranging from 0 to 4, specifically 0 to 2.

Since the repeating unit represented by Chemical Formula 3 may have a flexible structure, it may improve the elongation of a polyamide combination including the repeating unit represented by Chemical Formula 3 and may improve the flexibility thereof. In addition, without being bound by theory, a repeating unit of Chemical Formula 3 may effectively maintain the colorlessness and/or transparency of a polyamide combination by suppressing white cloudiness that appears upon elongation of the films and also suppressing the formation of crystals when the film is elongated after the film is obtained from the polyamide combination.

In Chemical Formula 3, since $R^{10}$ includes a functional group that may interfere with the formation of an intramolecular and intermolecular charge transfer complex, it may improve the transparency of a polyamide including a repeating unit represented by Chemical Formula 3.

In an embodiment, $R^{10}$ may be —SO$_2$—, —O—, —C(CF$_3$)$_2$—, —C(CCl$_3$)$_2$—, —C(CBr$_3$)$_2$—, —CF$_2$—, CCl$_2$—, or —CBr$_2$—, but is not limited thereto.

In Chemical Formula 3, since $R^{11}$ may have a stable cyclic structure (an aromatic organic group), it may maintain the excellent heat resistance and mechanical strength of a polyamide combination including a repeating unit represented by Chemical Formula 3.

The specific examples of $R^{11}$ are the same as in the specific examples in the formulae above for $R^2$.

In an embodiment, in Chemical Formula 3, $R^{12}$ and $R^{13}$ may be the same or different and are each independently a single bond, -Ph-, —O-Ph-, or —C(CF$_3$)$_2$-Ph-, but they are not limited thereto. Herein, Ph is a phenylene group.

Due to the properties mentioned above, the polyamide combination according to an embodiment includes a first polyamide having a relatively rigid structure and a second polyamide having a relatively flexible structure, so the polyamide combination may provide excellent colorlessness and/or transparency, heat resistance, mechanical strength, and flexibility.

Consequently, the polyamide combination may be used as a material for various films requiring one or a combination of colorlessness, transparency, heat resistance, mechanical strength, or flexibility. For example, the polyamide combination may be applicable to a substrate for a display, a touch panel, a protective film for an optical disk, and the like.

In an embodiment, the first polyamide may contain none of the repeating unit represented by Chemical Formula 3. The first polyamide may contain from about 1 to about 100 mole percent (mol %) of the repeating unit represented by Chemical Formula 1, specifically from about 5 to about 40 mol % of the repeating unit represented by Chemical Formula 1, and from about 1 to about 100 mol % of the repeating unit represented by Chemical Formula 2, specifically from about 20 to about 70 mol % of the repeating unit represented by Chemical Formula 2.

In another embodiment, the second polyamide may contain none of the repeating unit represented by Chemical Formula 1, none of the repeating unit represented by Chemical Formula 2, or a combination thereof.

Alternatively, the first polyamide may further include the repeating unit represented by Chemical Formula 3.

Also, the second polyamide may further include the repeating unit represented by Chemical Formula 1, the repeating unit represented by Chemical Formula 2, or a combination thereof.

When the first polyamide further includes the repeating unit represented by Chemical Formula 3 and the second polyamide further includes the repeating unit represented by Chemical Formula 1, the repeating unit represented by Chemical Formula 2, or a combination thereof, a mole percent of the repeating unit represented by Chemical Formula 1, the repeating unit represented by Chemical Formula 2, or a combination thereof based on the total moles (100 mol %) of repeating units of the first polyamide may be larger than a mole percent of the repeating unit represented by Chemical Formula 1, the repeating unit represented by Chemical Formula 2, or a combination thereof based on the total moles (100 mol %) of repeating units of the second polyamide. In other words, the first polyamide may have a relatively rigid structure, and the second polyamide may have a relatively flexible structure. When the first and second polyamides contain at least some of the same repeating units, the first and second polyamides may be more compatible, such that, the first polyamide may be easily blended or alloyed with the second polyamide, and thereby prevent or reduce phase separation in the polyamide combination. In addition, it may improve the heat resistance and mechanical strength of the polyamide combination.

Particularly in the foregoing embodiment, the first polyamide may include a repeating unit represented by Chemical Formula 1, a repeating unit represented by Chemical Formula 2, or a combination thereof at about 10 mol % or more, for example, about 30 mol % or more based on the total moles of repeating units of the first polyamide. Particularly, the first polyamide may include about 10 mol % to about 90 mol %, particularly about 10 mol % to about 50 mol %, and more particularly about 10 mol % to about 30 mol % of the repeating unit represented by Chemical Formula 1, a repeating unit represented by Chemical Formula 2, or a combination thereof, based on the total moles (100 mol %) of repeating units of the first polyamide. In this case, the first polyamide may be easily combined with the second polyamide so that it may prevent or reduce phase separation in the polyamide combination. In addition, the first polyamide may effectively improve the heat resistance and mechanical strength of the polyamide combination including the first polyamide, and simultaneously, it may effectively improve the flexibility.

Particularly, the second polyamide may include the repeating unit represented by Chemical Formula 1, the repeating unit represented by Chemical Formula 2, or a combination thereof in an amount of less than about 30 mol %, or more particularly of less than about 10 mol %, based on the total moles of repeating units of the second polyamide, provided that the first polyamide includes a larger amount of the repeating unit represented by Chemical Formula 1, the repeating unit represented by Chemical Formula 2, or a combination thereof compared to the second polyamide. In this case, the second polyamide may be mixed with the first polyamide so that it may prevent or reduce phase separation in the polyamide combination. In addition, the second polyamide may improve the flexibility of a polyamide combination including the second polyamide and simultaneously effectively improve the heat resistance and mechanical strength. Furthermore, addition of the second polyamide may be economical since it reduces the amount of expensive reagents used in preparation of the polyamide combination.

When the first polyamide includes a larger amount of the repeating unit represented by Chemical Formula 1, the repeating unit represented by Chemical Formula 2, or a combination thereof compared to the second polyamide, the first polyamide may include the repeating unit represented by Chemical Formula 1, the repeating unit represented by Chemical Formula 2, or a combination thereof, in an amount of about 20 mol % to about 40 mol %, based on the total moles (100 mol %) of repeating units of the first polyamide, and the second polyamide may include the repeating unit represented by Chemical Formula 1, the repeating unit represented by Chemical Formula 2, or a combination thereof, in an amount of about 20 mol % to about 40 mol %, based on the total moles (100 mol %) of repeating units of the second polyamide, provided that the first polyamide includes a larger amount of the repeating unit represented by Chemical Formula 1, the repeating unit represented by Chemical Formula 2, or a combination thereof compared to the second polyamide. In this case, the first polyamide may be easily combined with the second polyamide so that it may prevent or reduce the phase separation in the polyamide combination. In addition, the polyamide combination may have excellent flexibility and simultaneously excellent heat resistance and mechanical strength.

The first polyamide may have an average molecular weight ("Mw") of about 20,000 grams/mole (g/mol) to about 400, 000 g/mol. In an embodiment of the first polyamide having a weight average molecular weight within this range, the polyamide combination may have excellent workability and processibility, and a film obtained from a polyamide combination made by using the first polyamide may have excellent mechanical properties such that it is relatively less brittle. In an embodiment, the first polyamide may have an average molecular weight (Mw) of about 50,000 g/mol to about 400,000 g/mol.

The second polyamide may have an average molecular weight (Mw) of about 20,000 g/mol to about 400,000 g/mol. When the second polyamide has a weight average molecular weight within the range, a polyamide combination may have excellent workability and processibility, and a film obtained from a polyamide combination made by using the second polyamide may have excellent mechanical properties such that it is relatively less brittle. In an embodiment, the second polyamide may have an average molecular weight (Mw) of about 50,000 g/mol to about 400,000 g/mol.

Embodiments of the polyamide combination may include the first polyamide and the second polyamide at a weight ratio of the first polyamide to the second polyamide of about 1:99 to about 60:40. In embodiments where the polyamide combination includes the first polyamide and the second polyamide within this range, the first polymer may be easily combined with the second polymer to prevent or reduce phase separation and improve the transparency of the polyamide combination. In addition, the polyamide combination may effectively manifest both the first polyamide properties of heat resistance and mechanical strength and the second polyamide property of flexibility. The polyamide combination may also be economical to produce since the amount of the first polyamide that is prepared by using an expensive reagent is reduced. Alternative embodiments of the polyamide combination may include the first polyamide and the second polyamide within the weight ratio of the first polyamide to the second polyamide of about 10:90 to about 40:60, and more particularly, the polyamide combination may include the first polyamide and the second polyamide within the weight ratio of the first polyamide to the second polyamide of about 10:90 to about 30:70.

The polyamide combination may have a total light transmittance at a wavelength range of about 380 nanometers (nm) to about 700 nm of about 80% to about 100%, and light transmittance at a wavelength of about 400 nm of about 60% to about 100%. For an embodiment with the light transmittance of the polyamide combination within this range, the polyamide combination may be easily used for providing a film used in various applications requiring transparency. Particularly, the polyamide combination may have total light transmittance at a wavelength range of about 380 nm to about 700 nm of about 80% to about 95%, and light transmittance at a wavelength of about 400 nm of about 60% to about 85%.

The polyamide combination may be colorless.

Hereinafter, an embodiment of a method of preparing a polyamide combination is described.

The polyamide combination may be prepared by providing a first polyamide and a second polyamide, and combining the first polyamide and the second polyamide.

The first polyamide and the second polyamide may be prepared by, for example, low temperature solution polymerization, interface polymerization, fusion polymerization, solid-phase polymerization, and so on, but is not limited thereto.

The method of preparing the first polyamide and the second polyamide is described according to the low temperature solution polymerization as one example. The low temperature solution polymerization may provide a polyamide by polymerizing a carboxylic acid dichloride and diamine in an aprotic polar solvent.

The aprotic polar solvent may include, for example, a sulfoxide-based solvent such as dimethylsulfoxide, diethylsulfoxide, and the like, a formamide-based solvent such as N,N-dimethylformamide, N,N-diethylformamide, and the like, an acetamide-based solvent such as N,N-dimethylacetamide, N,N-diethylacetamide, and the like, a pyrrolidone-based solvent such as N-methyl-2-pyrrolidone, N-vinyl-2-pyrrolidone, and the like, a phenol-based solvent such as phenol, o-, m-, or p-cresol, xylenol, halogenated phenol, catechol, and the like, or hexamethylphosphoramide, γ-butyrolactone, and the like. These solvents may be used singularly or in a combination of two or more. However, without limitation, an aromatic hydrocarbon such as xylene, toluene, and the like may also be used. In addition, in order to accelerate the dissolution of the polymer, an alkali metal salt or an alkali earth metal salt may be further added to the solvent at about 50 weight percent (wt %) or less based on the weight of the solvent.

The first polyamide and the second polyamide may be prepared by reacting a diamine and a carboxylic acid dichloride in the aprotic polar solvent. The diamine may be selected from 4,4'-(9-fluorenylidene)dianiline ("BAPF"), 2,2'-bis(trifluoromethyl)benzidine ("TFDB"), 4,4'-diaminodiphenyl sulfone ("DADPS"), bis[4-(4-aminophenoxy)phenyl]sulfone ("BAPS"), 4,4'-diaminodiphenyl ether, 1,4-bis(4-aminophenoxy)benzene, 1,3-bis(4-aminophenoxy)benzene, 2,5-bis(4-aminophenoxy)biphenyl, 1,3-bis(4-aminophenoxy)-5-(2-phenylethynyl)benzene, 4,4'-diphenylenediamine, 4,4'-diamino-3,3'-dihydroxybiphenyl, 4,4'-diamino-2,2'-dichlorobiphenyl, 4,4'-diaminodiphenyl sulfide, 3,7-diamino-2,8-dimethyldibenzothiophene-5,5-dioxide, and a combination thereof. The carboxylic acid dichloride may be selected from terephthaloyl chloride ("TPCl"), isophthaloyl chloride ("IPCl"), naphthalene dicarbonylchloride, biphenyl dicarbonylchloride, terphenyl dicarbonylchloride, 2-fluoroterephthaloyl chloride, and a combination thereof. The diamine and the carboxylic acid dichloride may be suitably selected and used according to the required composition of the first polyamide and the second polyamide.

According to another embodiment, a film prepared using the polyamide combination is provided.

The film may be prepared using the obtained polyamide combination according to a dry-wet method, a dry method, wet method, or the like, but is not limited thereto.

When the film is prepared according to the dry-wet method, the obtained polyamide combination is extruded on a support such as a drum, an endless belt, or the like from a nozzle to provide a layer, and the solvent is evaporated to dry the layer so that it can be further processed, for example, until it is self-supporting, that is, can be delaminated from the drum, belt, or the like. The drying may be performed at, for example, about 25° C. to about 220° C. within about 1 hour. If the surface of a drum or an endless belt used for the drying process is smooth, it may provide a layer having a smooth surface. Alternatively, the drum or endless belt can be embossed to provide a desired surface configuration to the layer. The dried layer may be delaminated from the support, introduced to a wet process, subjected to salt and solvent removal, elongated, dried, and heated to provide a film.

The elongating the dried layer may be performed at a draw rate (e.g. a surface rate) in a range of about 0.8 to about 8, for example, particularly at a draw rate (e.g. a surface rate) of about 1.3 to about 8. The surface rate is defined as a value of the area of a surface layer after elongation divided by a value of the area of the surface layer before elongation, where a surface rate of 1 or less indicates a relaxed state. The dried layer may be elongated in a thickness direction as well as the surface direction.

The heat treatment may be performed at a temperature of about 200° C. to about 500° C., for example, about 250° C. to about 400° C., for about several seconds to about several minutes.

In addition, the layer may be slowly cooled after the elongating the layer and application of a heat treatment, for example, at a speed of about 50° C./sec or less, and particularly 30° C./sec or less.

The layer may be formed as a monolayer or a multilayer. Additionally, the multilayer may be formed with layers of a different material interposed between layers of the film formed from the polyamide combination. In an embodiment, an insulating or conductive layer may be interposed between layers of the film prepared using the polyamide combination. In a further embodiment, a layer of a material that absorbs light at a visible or non-visible visible wavelength may interposed between layers of the film prepared using the polyamide combination to produce a multilayer with a light filtering capacity.

The film prepared using the polyamide combination may have a coefficient of thermal expansion ("CTE") of about 40 parts per million (ppm)/° C. or less, and particularly about 35 ppm/° C. or less, measured over the range of about 50° C. to about 150° C. In an embodiment of the film having a coefficient of thermal expansion within this range, the film may improve the heat resistance of a substrate including the film and effectively improve the life-span and reliability of a device including the substrate that includes the film. Particularly, the film may have a coefficient of thermal expansion of about 10 ppm/° C. to about 35 ppm/° C., for example, about 10 ppm/° C. to about 30 ppm/° C.

The film may have haze of about 3% or less. In an embodiment of the film having haze within this range, the film may have sufficient transparency and excellent resolution for use in a wide array of applications. In further embodiments, the film may have haze of about 1.5% or less.

The film prepared using the polyamide combination may have a thickness of about 1 micrometer (μm) to about 1000 μm and particularly about 1 μm to about 800 μm, but is not limited thereto, and the thickness may be suitably controlled according to the usage.

Since the film includes a polyamide combination having excellent transparency, heat resistance, mechanical strength, and flexibility, the film may likewise retain those properties and provide excellent transparency, heat resistance, mechanical strength, and flexibility. The film may be used for various articles such as a substrate for a device, a substrate for a display, an optical film, an integrated circuit ("IC") package, an adhesive film, a multi-layer flexible printed circuit ("FPC"), a tape, a touch panel, a protective film for an optical disk, and the like.

According to another embodiment, a display device including the film is provided. Particularly, the display device may include a liquid crystal display ("LCD"), an organic light emitting diode ("OLED"), and the like, but is not limited thereto.

EXAMPLES

Hereinafter, this disclosure is illustrated in more detail with reference to examples. However, they are exemplary embodiments and are not limiting.

Synthesis Example 1

Synthesis of Polyamide

About 5 millimoles (mmol) of 4,4'-diaminodiphenyl sulfone (DADPS), about 5 mmol of 2,2'-bis(trifluoromethyl)benzidine (TFDB), about 5 mmol of terephthaloyl chloride (TPCl), and about 5 mmol of isophthaloyl chloride (IPCl) are mixed with N,N-dimethylacetamide ("DMAC") in a 100 milliliter (mL) 3-neck round-bottomed flask and reacted to provide a polyamide. The obtained polyamide has a weight average molecular weight of about 202,000 g/mol.

Synthesis Example 2 to Synthesis Example 13

Synthesis of Polyamide

A polyamide is prepared according to the same procedure as in Synthesis Example 1, except that the kinds and amounts of diamine and carboxylic acid dichloride are changed as shown in the following Table 1.

TABLE 1

|  | Diamine (mol %) | | | | Carboxylic acid dichloride (mol %) | | Weight average molecular weight (Mw) |
|  | DADPS (Chemical Formula 3) | BAPS (Chemical Formula 3) | TFDB (Chemical Formula 2) | BAPF (Chemical Formula 1) | TPCl | IPCl | (g/mol) |
| --- | --- | --- | --- | --- | --- | --- | --- |
| Synthesis Example 1 | 50 | — | 50 | — | 50 | 50 | 202,000 |
| Synthesis Example 2 | 40 | 30 | 30 | — | 50 | 50 | 176,000 |
| Synthesis Example 3 | 60 | 30 | 10 | — | 50 | 50 | 245,000 |
| Synthesis Example 4 | 50 | 40 | 10 | — | 50 | 50 | 118,200 |
| Synthesis Example 5 | 50 | 10 | 10 | 30 | 50 | 50 | 90,000 |
| Synthesis Example 6 | 70 | 20 | 10 | — | 50 | 50 | 46,000 |
| Synthesis Example 7 | 60 | 20 | 20 | — | 50 | 50 | 101,000 |
| Synthesis Example 8 | 70 | 10 | 20 | — | 20 | 80 | 115,000 |

TABLE 1-continued

| | Diamine (mol %) | | | | Carboxylic acid dichloride (mol %) | | Weight average molecular weight (Mw) |
|---|---|---|---|---|---|---|---|
| | DADPS (Chemical Formula 3) | BAPS (Chemical Formula 3) | TFDB (Chemical Formula 2) | BAPF (Chemical Formula 1) | TPCI | IPCI | (g/mol) |
| Synthesis Example 9 | 67 | — | 33 | — | 50 | 50 | 89,000 |
| Synthesis Example 10 | 50 | 50 | — | — | 50 | 50 | 100,000 |
| Synthesis Example 11 | 80 | 20 | — | — | 50 | 50 | 137,000 |
| Synthesis Example 12 | 75 | 25 | — | — | 50 | 50 | 90,000 |
| Synthesis Example 13 | 67 | 33 | — | — | 50 | 50 | 89,000 |

Example 1

Preparation of Polyamide Combination and Film

The polyamide obtained from Synthesis Example 2 and the polyamide obtained from Synthesis Example 13 are combined in a respective weight ratio of about 20:80 to provide a polyamide combination.

The polyamide combination is coated on a glass substrate and dried at about 65° C., 70° C., and 75° C. each for about 20 minutes and dried at about 80° C. and 130° C. each for about 30 minutes to provide a film. The obtained film is elongated in one direction at a speed of about 1%/sec at about 280° C. until a white cloudiness appears. The elongated film is annealed under a nitrogen atmosphere at about 320° C. for about 7 minutes to provide a film. The film has a thickness of about 50 μm.

Examples 2 to 8

Preparation of Polyamide Combination and Film

A polyamide combination and a film are obtained according to the same procedure as in Example 1, except that the kinds and amounts of polyamide are changed as shown in the following Table 2. The films obtained in Examples 2 to 8 have a thickness of about 50 μm.

Comparative Example 1

Preparation of Polyamide Combination and Film

A polyamide combination and a film are prepared according to the same procedure as in Example 1, except that the kinds and amounts of a polyamide are changed as shown in the following Table 2. The film obtained in Comparative Example 1 has a thickness of about 50 μm.

TABLE 2

| | First polyamide (wt %) | Second polyamide (wt %) | Transparency of polyamide combination (phase separation) |
|---|---|---|---|
| Example 1 | Synthesis Example 2 (20) | Synthesis Example 13 (80) | Transparent (No phase separation) |
| Example 2 | Synthesis Example 3 (30) | Synthesis Example 13 (70) | Transparent (No phase separation) |
| Example 3 | Synthesis Example 4 (30) | Synthesis Example 13 (70) | Transparent (No phase separation) |
| Example 4 | Synthesis Example 5 (30) | Synthesis Example 13 (70) | Transparent (No phase separation) |
| Example 5 | Synthesis Example 6 (30) | Synthesis Example 13 (70) | Transparent (No phase separation) |
| Example 6 | Synthesis Example 7 (30) | Synthesis Example 13 (70) | Transparent (No phase separation) |
| Example 7 | Synthesis Example 8 (30) | Synthesis Example 13 (70) | Transparent (No phase separation) |
| Example 8 | Synthesis Example 9 (30) | Synthesis Example 2 (70) | Transparent (No phase separation) |
| Comparative Example 1 | — | Synthesis Example 13 (100) | Transparent (No phase separation) |

Experimental Example 1

Measurement Coefficient of Thermal Expansion

The films obtained from Examples 1 to 8 and Comparative Example 1 are analyzed for a coefficient of thermal expansion ("CTE") using a thermo-mechanical analyzer ("TMA") with a heating rate of 5° C./minute (min.) and a pre-load of 10 milliNewtons (mN) (TMA available from TA Instruments, model TMA 2940), and the results are shown in the following Table 3.

Experimental Example 2

Measurement of Optical Properties

In order to evaluate the optical properties of the polyamide combinations obtained from Examples 1 to 8 and Comparative Example 1, light transmittance and haze are measured by a spectrophotometer (spectrophotometer available from KONICA MINOLTA), and the results are shown in the following Table 3.

Experimental Example 3

Measurement of Elongation Until White Cloudiness Appears

The elongation is measured until a white cloudiness appears while each film is prepared in Examples 1 to 8 and Comparative Example 1, and the results are shown in the following Table 3.

For example, the elongation is calculated according to the following Equation 1.

Elongation Until White Cloudiness Appears(%)=(($L_1$−$L_0$)/$L_0$)×100   Equation 1

In Equation 1, $L_0$ indicates the length before elongation, and $L_1$ indicates the length of the film when the white cloudiness appears.

TABLE 3

| | Coefficient of thermal expansion (ppm/° C.) | Light transmittance (%) | | | | | | Total light transmittance (%) | Haze (%) | Elongation until white cloudiness appears (%) |
| --- | --- | --- | --- | --- | --- | --- | --- | --- | --- | --- |
| | | 380 nm | 400 nm | 450 nm | 500 nm | 600 nm | 700 nm | | | |
| Example 1 | 22.97 | 24.57 | 75.84 | 84.81 | 86.19 | 87.44 | 87.94 | 86.86 | 1.05 | 50 |
| Example 2 | 34.43 | 19.8 | 67.72 | 80.98 | 83.18 | 86.16 | 87.5 | 84.73 | 1.04 | 50 |
| Example 3 | 24.95 | 24.45 | 70.68 | 82.31 | 84.11 | 86.59 | 87.7 | 85.4 | 1.07 | 66 |
| Example 4 | 31.15 | 15.25 | 66.16 | 81.25 | 83.27 | 86.25 | 87.54 | 84.86 | 0.9 | 50 |
| Example 5 | 30.42 | 25.12 | 71 | 82.08 | 83.99 | 86.51 | 87.65 | 85.31 | 0.64 | 61 |
| Example 6 | 24.56 | 16.69 | 62.53 | 78.66 | 81.77 | 85.54 | 87.35 | 83.75 | 1 | 55 |
| Example 7 | 23.43 | 23.33 | 65.12 | 78.86 | 81.98 | 85.59 | 87.28 | 83.88 | 0.66 | 66 |
| Example 8 | 16.28 | 26.45 | 75.27 | 83.54 | 85.28 | 87.10 | 87.80 | 86.27 | 1.16 | 53.5 |
| Comparative Example 1 | 45.12 | 19.8 | 70.68 | 80.98 | 83.18 | 86.16 | 87.5 | 84.73 | 1.04 | 50 |

As shown in Table 3, it is confirmed that the films obtained from Examples 1 to 8 have smaller coefficients of thermal expansion than the film obtained from Comparative Example 1, so they have excellent heat resistance. In addition, the films obtained from Examples 1 to 8 have similar elongation until the white cloudiness appears as the film obtained from Comparative Example 1, or they have higher elongation than the film obtained from Comparative Example 1. Therefore, the white cloudiness rarely appears, and the molecular chains in the films readily align to produce the low coefficients of thermal expansion and to provide excellent durability.

Additionally, it is confirmed that the films obtained from Examples 1 to 8 have similar light transmittance to the film obtained from Comparative Example 1.

Accordingly, it is confirmed that the films obtained from Examples 1 to 8 may maintain excellent light transmittance and simultaneously reduce the coefficient of thermal expansion to improve the heat resistance.

While this disclosure has been described in connection with what is presently considered to be exemplary embodiments, it is to be understood that the invention is not limited to the disclosed embodiments, but, on the contrary, is intended to cover various modifications and equivalent arrangements included within the spirit and scope of the appended claims.

What is claimed is:

1. A polyamide combination comprising:
    a first polyamide comprising (i) a structure unit represented by Chemical Formula 2, and (ii) a structure unit represented by Chemical Formula 3; and
    a second polyamide (i) consisting of a structure unit represented by Chemical Formula 3,

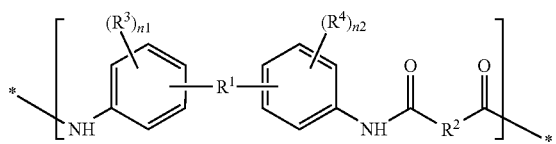

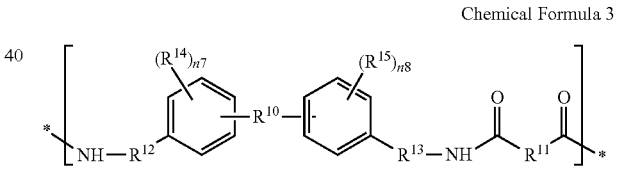

Chemical Formula 3 wherein, in Chemical Formula 2, $R^5$ is the same or different in each structure unit, and each $R^5$ is independently a substituted or unsubstituted C6 to C30 aromatic organic group, $R^6$ and $R^7$ are the same or different and are each independently an electron withdrawing group, $R^8$ and $R^9$ are the same or different and are each independently a halogen, a hydroxyl group, an ether group (—$OR^{204}$, wherein $R^{204}$ is a C1 to C10 aliphatic organic group), a silyl group (—$SiR^{205}R^{206}R^{207}$, wherein $R^{205}$, $R^{206}$, and $R^{207}$ are the same or different and are each independently hydrogen or a C1 to C10 aliphatic organic group), a substituted or unsubstituted C1 to C10 aliphatic organic group, or a C6 to C20 aromatic organic group, n3 is an integer ranging from 1 to 4, n5 is an integer ranging from 0 to 3, n3+n5 is an integer of 1 to 4, n4 is an integer ranging from 1 to 4, n6 is an integer ranging from 0 to 3, and n4+n6 is an integer of 1 to 4, Chemical Formula 3

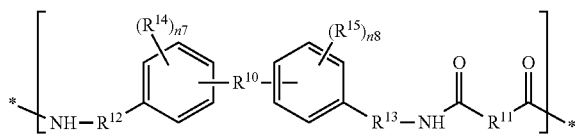

wherein, in Chemical Formula 3, $R^{10}$ is the same or different in each structure unit, and each $R^{10}$ is independently a noncyclic Si-containing group, a noncyclic P-containing group, a S-containing group, a halogen-substituted C1 to C10 aliphatic organic group, or a noncyclic ether bond (—O—)-containing group, $R^{11}$ is the same or different in each structure unit, and each $R^{11}$ is independently a substituted or unsubstituted C6 to C30 aromatic organic group, $R^{12}$ and $R^{13}$ are the same or different in each structure unit and are each independently a single bond or a substituted or unsubstituted C6 to C20 aromatic organic group, $R^{14}$ and $R^{15}$ are the same or different and are each independently a halogen, a hydroxyl group, an ether group (—$OR^{200}$, wherein $R^{200}$ is a C1 to C10 aliphatic organic group), a silyl group (—$SiR^{201}R^{202}R^{203}$, wherein $R^{201}$, $R^{202}$, and $R^{203}$ are the same or different, and are each independently hydrogen or a C1 to C10 aliphatic organic group), a substituted or unsubstituted C1 to C10 aliphatic organic group, or a C6 to C20 aromatic organic group, and n7 and n8 are each independently integers ranging from 0 to 4, wherein the electron withdrawing group is —$CF_3$, —$CCl_3$, —$CBr_3$, —$CI_3$, —F, —Cl, —Br, —I, —$NO_2$, —CN, —$COCH_3$, or —$CO_2C_2H_5$, wherein the first polyamide comprises the structure unit represented by Chemical Formula 2 in an amount of from about 10 mol % to about 30 mol % based on the total moles of the structure units of the first polyamide, wherein the first polyamide has a weight average molecular weight (Mw) of from about 101,000 g/mol to about 176,000 g/mol, and wherein the first polyamide and the second polyamide are included at a weight ratio of the first polyamide to the second polyamide of from about 20:80 to about 30:70.

2. The polyamide combination of claim 1, wherein $R^{10}$ is —$SO_2$—, —O—, —$C(CF_3)_2$—, —$C(CCl_3)_2$—, —$C(CBr_3)_2$—, —$CF_2$—, $CCl_2$—, or —$CBr_2$—.

3. The polyamide combination of claim 1, wherein $R^{12}$ and $R^{13}$ are the same or different and are each independently a single bond, -Ph-, —O-Ph-, or —$C(CF_3)_2$-Ph-, wherein Ph is a phenylene group.

4. The polyamide combination of claim 1, wherein $R^5$, and $R^{11}$ are the same or different and are each independently selected from the group consisting of the following chemical formulae:

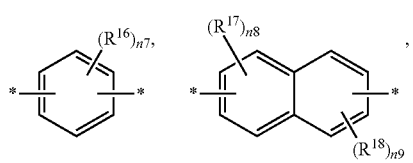

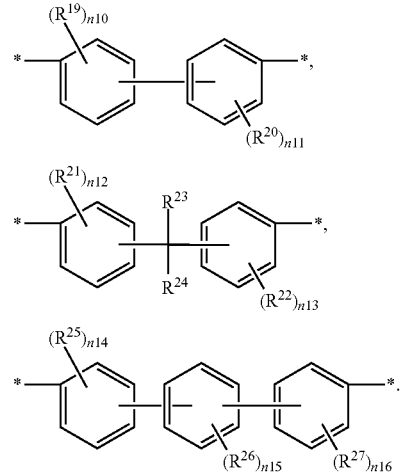

wherein, in the chemical formulae, $R^{16}$ to $R^{27}$ are the same or different and are each independently a halogen, a substituted or unsubstituted C1 to C10 aliphatic organic group, or a substituted or unsubstituted C6 to C20 aromatic organic group, n7 and n10 to n16 are each independently integers ranging from 0 to 4, and n8 and n9 are each independently integers ranging from 0 to 3, provided that the number of carbon atoms in each of the chemical formulae does not exceed 30 carbon atoms.

5. The polyamide combination of claim 4, wherein $R^5$, and $R^{11}$ are the same or different and are each independently selected from the group consisting of the following chemical formulae:

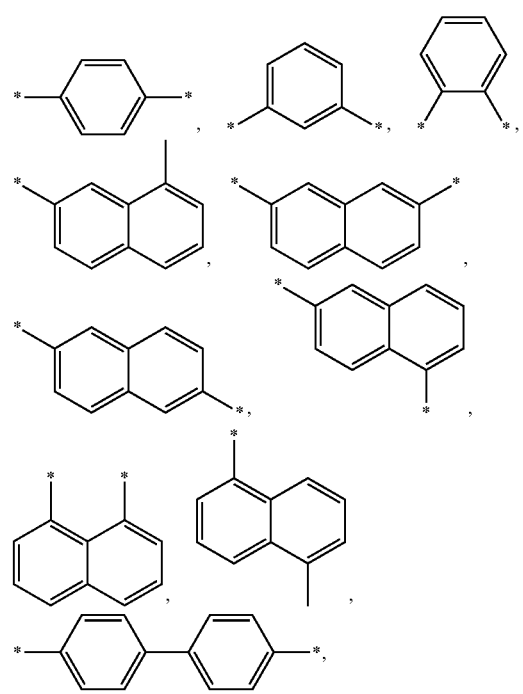

-continued

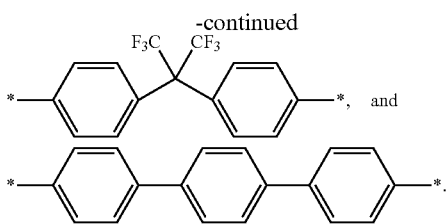

6. The polyamide combination of claim 1, wherein the first polyamide comprises the structure unit represented by Chemical Formula 2 in an amount of about 30 mol % based on the total moles of structure units of the first polyamide.

7. The polyamide combination of claim 1, wherein the second polyamide has a weight average molecular weight (Mw) of about 20,000 g/mol to about 400,000 g/mol.

8. The polyamide combination of claim 1, wherein the polyamide combination has a total light transmittance at a wavelength range of about 380 nm to about 700 nm of about 80% or more.

9. The polyamide combination of claim 1, wherein the polyamide combination has a light transmittance at a wavelength of about 400 nm of about 60% or more.

10. The polyamide combination of claim 1, wherein
the structure unit represented by Chemical Formula 2 is a reaction product of 2,2'-bis(trifluoromethyl)benzidine and a carboxylic acid dichloride selected from the group consisting of terephthaloyl chloride and isophthaloyl chloride, and
the structure unit represented by Chemical Formula 3 is a reaction product of a diamine selected from the group consisting of 4,4'-diaminodiphenyl sulfone and bis[4-(4-aminophenoxy)phenyl]sulfone and a carboxylic acid dichloride selected from the group consisting of terephthaloyl chloride and isophthaloyl chloride.

11. A film prepared using the polyamide combination according to claim 1.

12. The film of claim 11, wherein the film has a coefficient of thermal expansion from about 10 ppm/° C. to about 30 ppm/° C.

13. A display device comprising the film according to claim 11.

* * * * *